(12) United States Patent
Brosseau

(10) Patent No.: US 8,770,650 B1
(45) Date of Patent: Jul. 8, 2014

(54) VARIABLE GEOMETRY AERODYNAMIC FAIRING FOR REDUCING BASE DRAG OF TRACTOR TRAILERS

(76) Inventor: Jon Andrew Brosseau, Los Altos, CA (US)

( * ) Notice: Subject to any disclaimer, the term of this patent is extended or adjusted under 35 U.S.C. 154(b) by 630 days.

(21) Appl. No.: 12/661,076

(22) Filed: Mar. 10, 2010

(51) Int. Cl.
*B62D 35/00* (2006.01)
*B62D 37/02* (2006.01)

(52) U.S. Cl.
CPC .............. *B62D 35/001* (2013.01); *B62D 37/02* (2013.01)
USPC ...................................................... 296/180.5

(58) Field of Classification Search
CPC ...................................................... B62D 35/001
USPC .................. 296/180.4, 180.5, 180.1
See application file for complete search history.

(56) References Cited

U.S. PATENT DOCUMENTS

| | | | |
|---|---|---|---|
| 4,153,288 A | | 5/1979 | Mueller |
| 4,458,936 A | | 7/1984 | Mulholland |
| 5,240,306 A | | 8/1993 | Flemming |
| 5,947,548 A | | 9/1999 | Carper et al. |
| 6,485,087 B1 * | | 11/2002 | Roberge et al. ............ 296/180.5 |
| 6,799,791 B2 * | | 10/2004 | Reiman et al. ............. 296/180.1 |
| 6,854,788 B1 * | | 2/2005 | Graham ..................... 296/180.4 |
| 6,915,611 B2 | | 7/2005 | Reiman et al. |
| 7,207,620 B2 | | 4/2007 | Cosgrove et al. |
| 7,240,958 B2 | | 7/2007 | Skopic |
| 7,243,980 B2 | | 7/2007 | Vala |
| 7,374,230 B2 | | 5/2008 | Breidenbach |
| 7,380,868 B2 | | 6/2008 | Breidenbach |
| 7,585,015 B2 | | 9/2009 | Wood |
| 7,604,284 B2 | | 10/2009 | Reiman et al. |
| 7,618,086 B2 | | 11/2009 | Breidenbach |
| 7,625,034 B1 | | 12/2009 | Fitzgerald |

\* cited by examiner

*Primary Examiner* — Glenn Dayoan
*Assistant Examiner* — Melissa A Black
(74) *Attorney, Agent, or Firm* — John M Hart

(57) ABSTRACT

A variable geometry aerodynamic fairing is described for reduction of the base drag of a tractor trailer traveling at highway speed. The base drag reduction is provided by a set of two adjustable rectangular fairings which can be opened from a flat configuration when folded one against each side door, into a set of curved airfoil shaped fairings extending into the boundary layer adjacent to the trailer sides and cambered such as to turn a portion of the mainstream side air flow into the base wake region of the trailer. The cambered fairings thus reduce the strength of the standing base wake vortices and hence, the resultant negative base pressures (drag) formed in the trailer wake region. A direct application of this device would be to improve the fuel economy of a large portion of the U.S. trucking fleet during highway transit, while still providing rapid fairing retraction into a thin, flat stowed position against the trailer doors for unloading at destination.

7 Claims, 5 Drawing Sheets

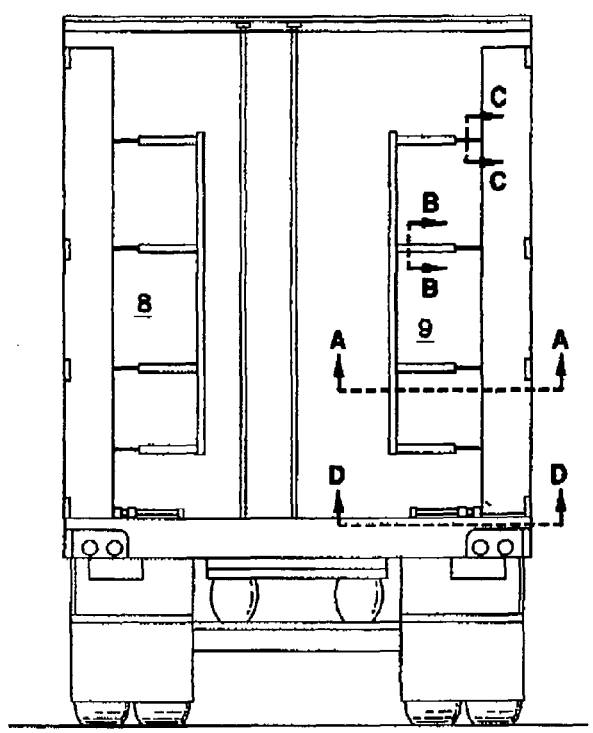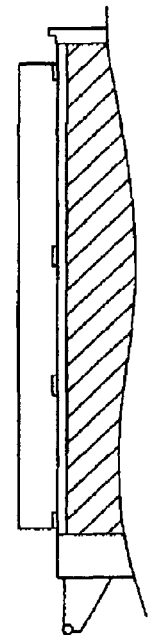
FIG. 1    FIG. 2
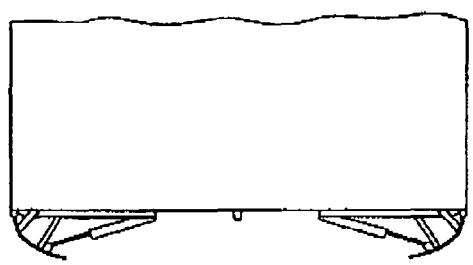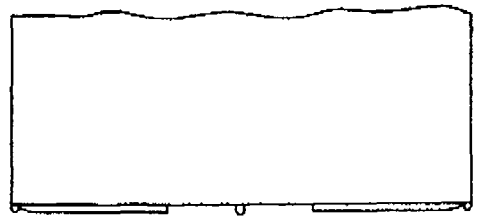
FIG. 3    FIG. 4

Sec. A

Sec. A

Sec. A

Sec. A

Sec. B

Sec. B

Sec. C

Sec. E

Sec. E

Sec. D

Sec. D

VARIABLE GEOMETRY AERODYNAMIC FAIRING FOR REDUCING BASE DRAG OF TRACTOR TRAILERS

BACKGROUND OF THE INVENTION

1. Field of the Invention

The present invention relates generally to the design of an aerodynamic drag reduction geometry for minimizing the drag and wake turbulence behind a tractor trailer traveling at highway speed.

It is well known from the prior art and fluid dynamics references that there is considerable drag induced at the rear of a blunt base tractor trailer traveling at moderate speed. This base drag is largely composed of a low pressure region generated from the turbulent mixing of wake vortices formed at the sides of the trailer base, and increases as the square of the forward velocity. When tractor trailers are operated as line haul (long haul) over considerable distances across the United States, the excess fuel consumed due to this base drag becomes a significant incurred cost to the transportation industry. As the cost of diesel fuel increases, any reduction in the overall drag of the United States tractor trailer fleet will produce higher efficiency and less reliance on foreign oil. Recently California Air Resources Board (CARB) has mandated use of aerodynamic devices to improve efficiency of 53-ft. refrigerated and dry van trailers by 4% and 5% fuel savings. Therefore, this mandate requires new concepts of very efficient aerodynamic devices to meet this challenge.

2. Description of the Prior Art

Over the years, there have been improvements made to reduce the aerodynamic drag of tractor trailers to decrease fuel consumption and improve efficiency of operation. These improvements have reduced the form drag of the tractor and the interference/gap drag between the tractor and trailer; however, at the rear of the trailer, where significant base drag occurs, no designs have so far gained acceptance, nor have effectively addressed the aerodynamics of turning trailer side flow into the trailer base region after 53 feet of boundary layer buildup.

Fixed shape fairings mounted at the base of the trailer have been proposed, but are cumbersome, heavy, difficult to remove and replace and have not been embraced by the trucking industry. Exhaust gas injection to the trailer base has been proposed, however, piping losses incurred to the tractor engine would negate any gains in base drag reduction. Inflatable membranes have also been proposed at the base of the trailer, but the inability to carefully shape and control the membrane surface under buffeting loads have not been addressed nor adopted as practical. Attempts have been made to make rear fairings mounted to the base of the trailer retractable, so as to permit easy loading and unloading operations. These designs, however, have consisted of complex flat panels, which are heavy, time consuming to extend or retract, and do not provide an efficient curved aerodynamic shape to transition the air flow into the base region without incurring separation and loss of effectiveness. In most of these flat panel designs, very detailed drawings and descriptions of linkages, hinges, coverings, actuators, etc., are included, but little note is given to the actual aerodynamics required in turning a turbulent flow field into a blunt base. These designs lack an understanding of the boundary layer flow present at the edge juncture of the trailer base and the control of adverse pressure gradients able to cause viscous flow separation which would render further drag reduction unlikely. Without attention to controlling the boundary layer and pressure gradients by use of a properly cambered section, curved airfoil shaped fairing, these designs prove ineffective. In general, no widespread adoption of these flat panel designs have occurred.

SUMMARY OF THE INVENTION

The present invention makes use of aerodynamic principles to contour a set of highly efficient, retractable, cambered airfoil shaped thin rectangular fairings that are mirror images of each other. They are attached to each rear door of a semi tractor trailer using the existing trailer door hinge pins and door hinge brackets in such a manner as to permit, when extended into the side flow, a portion of the trailer side boundary layer flow to be captured and injected into the base region for direct pressure drag reduction, as well as to effectively use the upper surface of the cambered fairing, for turning an additional portion of the trailer side flow into the trailer base region. These combine to reduce overall base drag associated with the separated vortices in the wake region. When the trailer is stopped for unloading, the two thin rectangular curved airfoil fairings are easily retracted into flat panels adjacent to the rear doors to allow for full opening.

Each fairing assembly on each door is constructed of a thin rectangular aluminum panel, suitably reinforced at mount points, which span the height of each trailer door from the lowest hinge point to the highest hinge location, and is supported at the leading edge by hinged brackets at each hinge pin, as well as two or more mounting points within mount channels which are bolted directly to the door hinge mount bolts. These mount channels contain extension, locking, and retraction, locking hardware. Also contained within these mount channels are actuation cams, mounted on a shaft at right angle to the channels, which push the thin aluminum sheet fairings outward to form a curved cambered airfoil section that is restrained at its leading edge by pivoting hinged points secured to the hinge pins. These hinge points can pivot outward into the trailer side flow field boundary layer allowing the fairing leading edge to capture a portion of the flow field and divert it under the fairing into the base region. The presence of the outer surface of the curved fairing at the trailer door edge causes additional side flow to turn and flow along the top of the fairing, without separating, thereby reducing an additional portion of the base drag. A flat fairing or surface placed at this edge location, as suggested by previous art, would, without suitable curvature or boundary layer control, induce flow separation and, hence, negate its effectiveness. For flow efficiency the shape of the fairing must conform very closely to that of a cambered wing whose section shape is adapted to the flow field determined by the transit velocity. The application of inducting a portion of the trailer side low speed boundary layer under the cambered fairing, reduces the likelihood of flow separation on the upper surface of the cambered fairing much like that of a high lift wing flap, thereby improving its flow turning effectiveness without creating flow separation. The cord of the fairing shown in this embodiment of the design is, unlike those in many of the previous art, selected to be of a sufficient width to effectively and efficiently turn a portion of the side flow into the trailer base region and still retract within the confines of the door hardware. Cords of 25% to 40% of the door width may be accommodated within this design and are, as such, adaptable to different trailer door geometries. By use of boundary layer induction at the leading edge, the cambered fairing design provides a more effective turning surface per given span length due to the reduction of adverse pressure gradients leading to turbulent flow separation.

In each assembly there is further provided gas spring cylinders for each fairing, of such size, location, and force as to provide extension of the stowed panels, provide pivot point restraining forces on the panels, and provide damping of the panels under buffeting loads. These gas spring cylinders are mounted to the aluminum fairing at a rearward location under the panel, sufficient to provide a restraining force opposite to the actuation cam force so that when extended and suitably pinned within the channels and mount brackets, the panel forms a variable cambered, adjustable shaped airfoil fairing, whose section properties produce near optimal efficiency. By properly balancing these mount and cam forces, a flexible thin rectangular sheet of aluminum is curved into a rigid structural shell capable of withstanding the lift, drag, and buffeting loads imposed upon it at nominal highway speeds.

Utilizing these and other aspects of the invention disclosed herein, the aerodynamic and structural rigidity aspects of the fairing and mounting design each contribute to enhance the other. The two fairings can be rapidly unlocked, extended, and deployed by one person within minutes prior to highway travel, and upon reaching an off load dock, just as rapidly unlock, stow, and relock both fairings flat against the two trailer doors. The flat, stowed position would then allow both doors to be swung into a full open position for loading or unloading. Since the curvature of the cambered fairing is well within its elastic range, the fairing will return to its planar stowed shape upon release of the cams external bending force. Thin aluminum sheet of aircraft quality and temper may be elastically curved and straightened thousands of times without regard to fatigue and would, under nominal operation, be expected to outlast the design life of the tractor trailer. Other materials, such as plastic, would be less likely to withstand the fatigue environments and temperature ranges experienced during year round transit.

BRIEF DESCRIPTION OF THE DRAWINGS

FIG. 1 Depicts a schematic back view of a tractor trailer with the present invention attached to the rear doors in an extended position.

FIG. 2 Depicts a schematic side view of a tractor trailer with the present invention attached to the rear doors in an extended position.

FIG. 3 Depicts a schematic top view of a tractor trailer with the present inventions attached to the rear doors in an extended position.

FIG. 4 Depicts a schematic top view of a tractor trailer with the present invention attached to the rear doors in a stowed position.

DETAILED DESCRIPTION OF THE INVENTION

In the figures, there are shown the exemplary embodiments of this invention which consists of two principal assemblies, first, a fairing assembly and second, a mounting support assembly. These two assemblies are secured to each of the two rear doors 8 & 9 which are part of the rear portion of a tractor trailer box.

The invention can be utilized to reduce base drag in any type of transport vehicle having a blunt base, however, the present embodiment pertains to a tractor trailer as depicted in FIGS. 1 through 4 in which the two rear doors are hinged to rotate in proximity to the axes defined by the vertical rear trailer edges and are supported by conventional door hinges secured by vertical hinge pins secured to hinge butts. This hinge arrangement allows the doors to open fully against the trailer sides for unloading, versus the roll up type of single door used in other trailer designs. This trailer hinge arrangement is incorporated into the design embodiment for mounting and alignment purposes and to alleviate the need to drill, weld or screw into the trailer structure, thus making the mounting easy to install and align.

Figure 14:
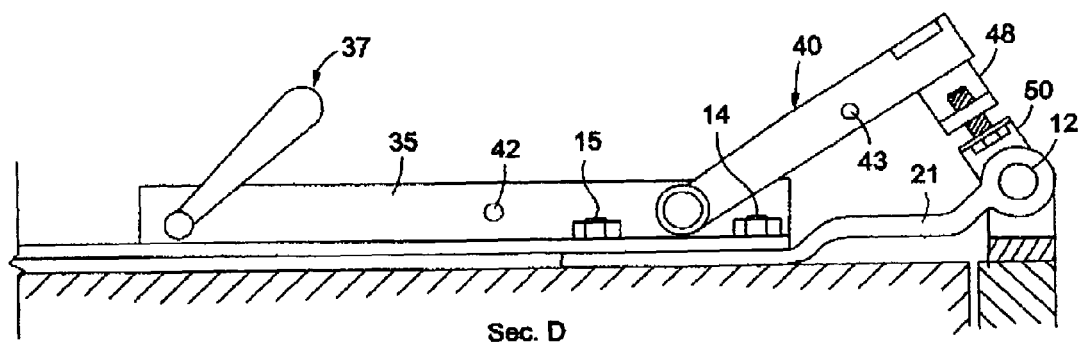
FIG. 14 Section D, depicts a vertical cross sectional base view of the bale and cam lock in a fully open and locked position.
Figure 15:
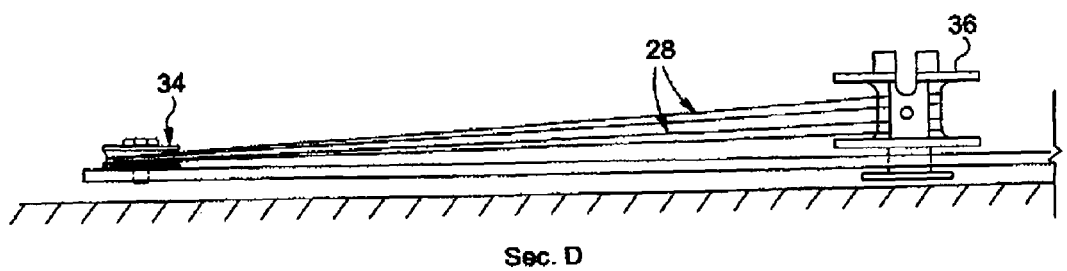
FIG. 15 Section D, depicts a cross sectional base view of the actuating locking, retrieval, and locking mechanisms located at the lowest hinge mount of the trailer door.

The two assemblies are identical, except that the fairing assembly on the left door is a mirror image of the one on the right door. The mount support assemblies are interchangeable and used on either left or right doors by merely rotating 180 degrees. The bale and cam rods are interchangeable and can be used on either left or right door. The bale and cam rod support bracket and cable retrieval and locking system shown in FIGS. 14 & 15 is a mirror image of the left door and used on the right.

For convenience, the following detailed description will generally refer to the components of the right trailer door assembly only, it being recognized that the description applies equally well to that of the left door assembly.

Referring to FIG. 1, the vertical rectangular fairing assembly 11 is constructed of a thin aluminum sheet, suitably reinforced at key structural points and supported in such manner, that when stowed flat against the door for opening, FIG. 4, the fairing is flexible and conforms to and is locked adjacent to the door so as to allow the door to fully open for unloading. The fairing mounting support assembly utilizes the trailer door hinge 21, door hinge bolts 14 & 15 and door hinge pin 20 as attach points. The fairing assembly can be opened and extended while remaining fixed to the door hinge 21 and door hinge pin 20, FIGS. 5 & 6. One or more door hinge and pin arrangements can be employed for structural support, with the greater number used providing greater stability under highway loading conditions.

Figure 5:
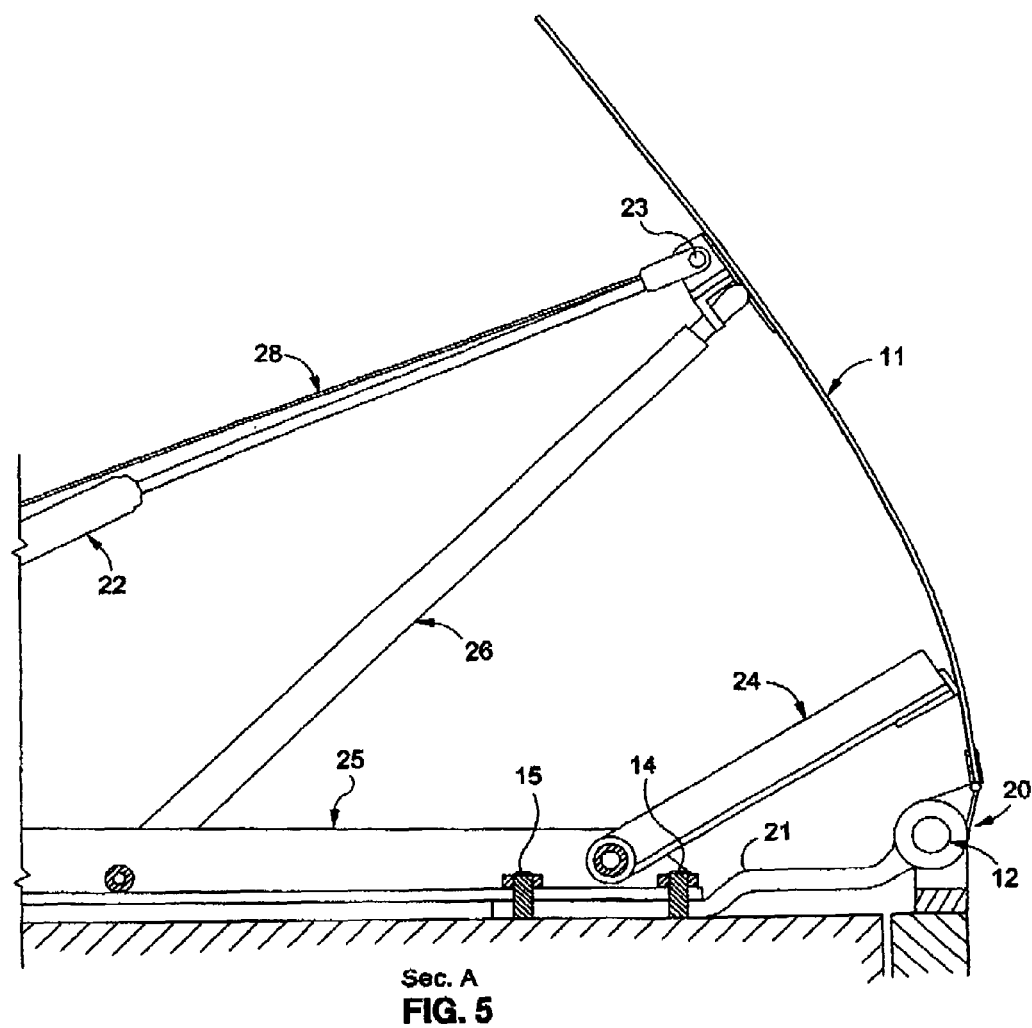
FIG. 5 Section A, depicts a bottom cross sectional detailed view showing the mechanical elements of the present invention in an extended position.
Figure 6:
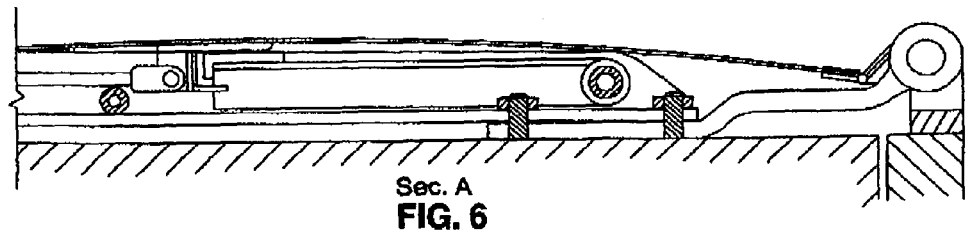
FIG. 6 Section A, depicts a bottom cross sectional detailed view showing the same mechanical elements of the present invention ion a stowed position.
Figure 7:
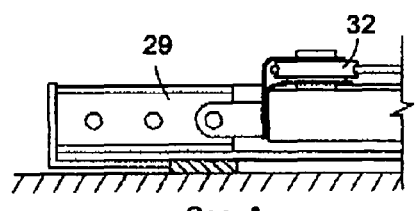
FIG. 7 Section A, depicts a bottom cross sectional end view of a typical spring gas cylinder and retrieval pulley stowed within a support channel.
Figure 8:
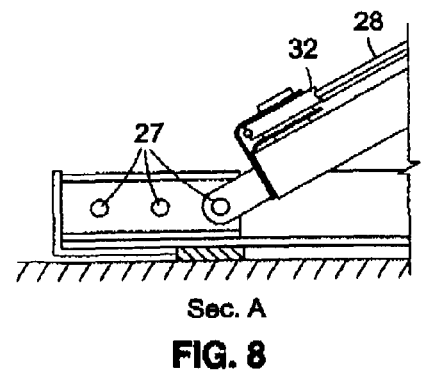
FIG. 8 Section A, depicts a cross sectional end view of a typical gas spring cylinder and retrieval pulley in an extended position.
Figure 9:
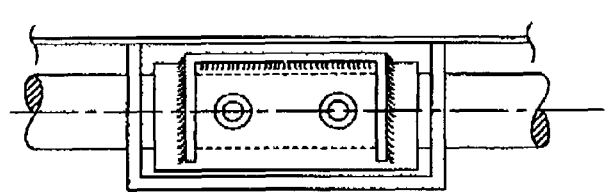
FIG. 9 Section B, depicts a cross sectional end view of the support channel within which lies the stowed actuation cam with the fairing resting on top of the channel.
Figure 10:
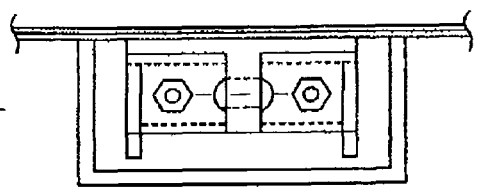
FIG. 10 Section B, depicts a cross sectional end view of the support channel within which lies the actuation cam locking the fairing against the top of the support channel.
Figure 11:
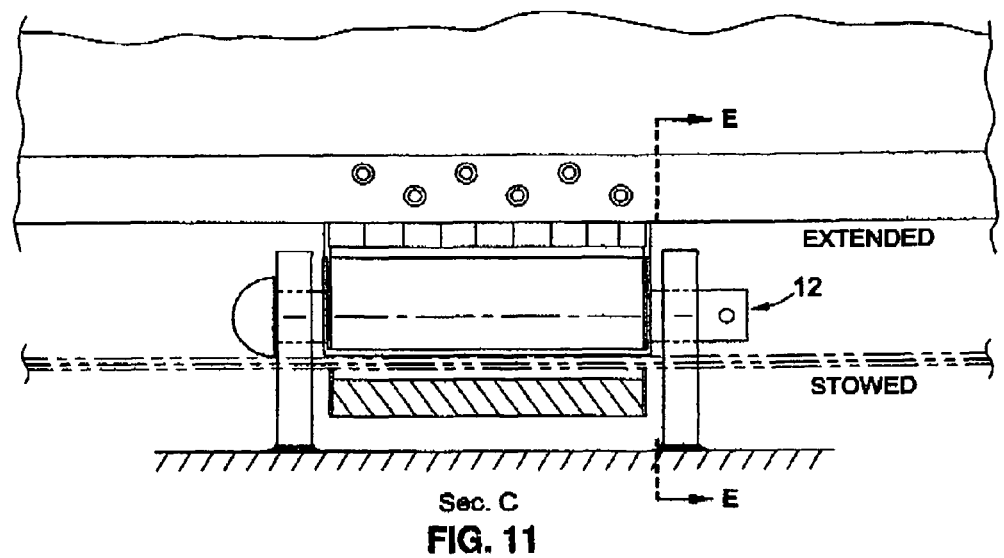
FIG. 11 Section C, depicts a cross section end view of the fairing attached to the forward hinged slotted pivot bracket which straddles the door hinge and is retained by the hinge pin.
Figure 12:
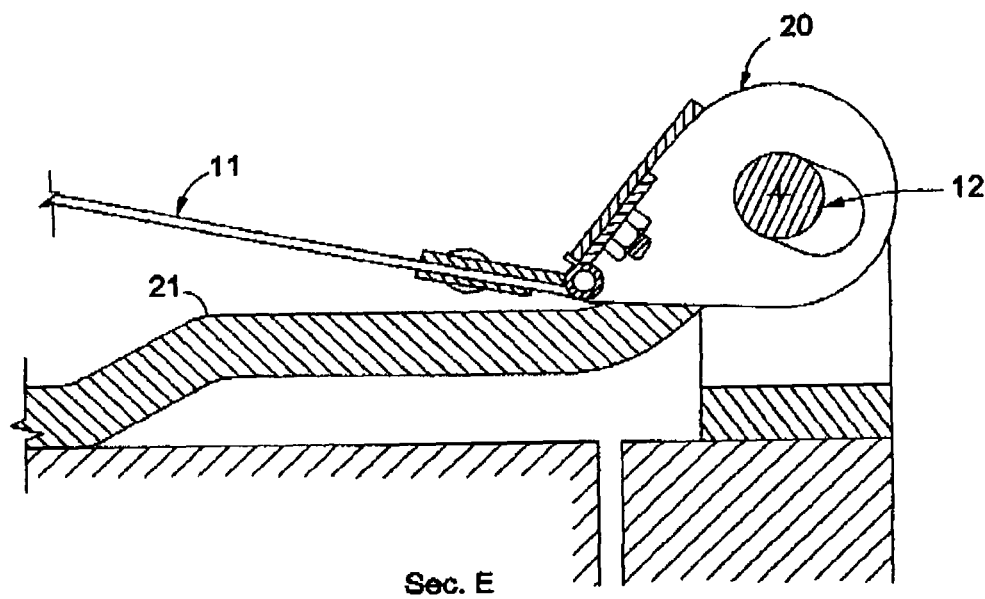
FIG. 12 Section E, depicts a cross sectional base view of the hinged slotted bracket pivot attached to the leading edge of the fairing in a stowed position.

Conversely, when the vertical rectangular fairing is extended into one of its several possible cambered airfoil shaped positions, FIGS. 3, 5, its thin aluminum skin assumes a rigid curved shell membrane structure capable of withstanding lift, drag and buffeting loads present at highway transit speeds. The curved shell's, FIG. 5, structural rigidity is facilitated by tensional loads consisting of restraining loads at the leading edge of the fairing from the pivoted hinged attachments 20 to the trailer door hinge pins 12, and opposite restraining loads from the fully extended gas spring cylinders 22 attached at the rearward pivoted portions of the fairing. These tension loads are induced and maintained by the interconnected cam extension arms 24 and support structure, having been rotated to a position near the 20% chord of the thin flexible fairing shell membrane 211 and shown locked by its cam lever arm in FIG. 14, 40 & 48. This locked position can be varied along with the gas spring cylinder pivot points FIG. 8, 27 to provide various cambered airfoil sections and boundary layer induction overhangs. When the cam shaft 24 and locking bale shaft 26 are secured in an extended and locked position, the fairing assembly is considered to be a stable rigid structure.

Figure 13:
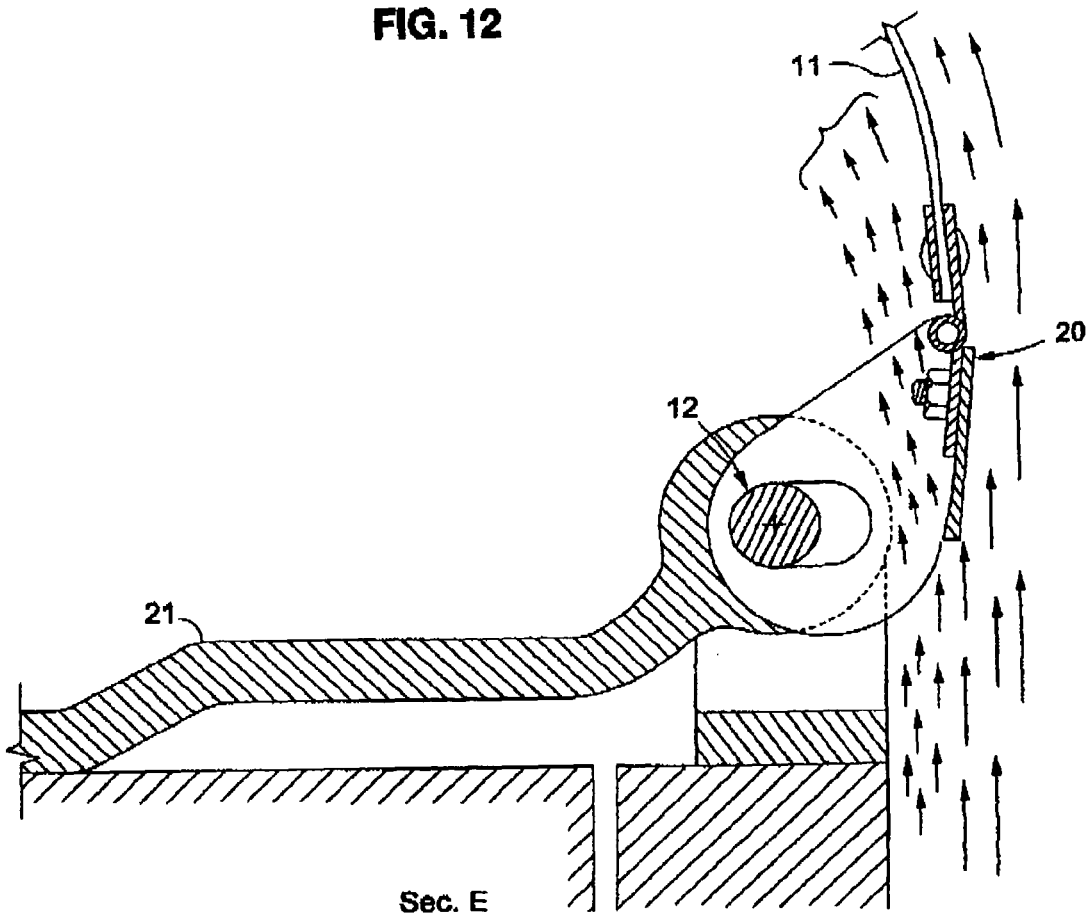
FIG. 13 Section E, depicts a cross sectional base view of the above components in an extended position intercepting the boundary layer flow field of the trailer side.

These rearward gas cylinder pivot points 27 can be adjusted to provide several different extension positions. These positions create differing amounts of fairing camber, which allows for the ability of the fairing structure 11 to be optimized for differing highway transit speeds. It also allows for a differential positioning of the left trailer door fairing to be more or less cambered than that of the right fairing which can be utilized to partially cancel the standing wake vortices which form in the trailer base wake, thus further enhancing the overall drag reduction. The pivot points are fastened to internal small channels 29 attached within the main mount channels 25 as well as to external mounts fastened above and below the main channels and pinned with drilled clevis pins secured by safety clips. The pivot point is easily changed by removal of the safety clips on each set of spring gas cylinders when extended. The gas spring cylinders 22 are sized to fit within the mount channels 25 when stowed and are of such length, that when extended, provide enough travel to open the fairing to an aerodynamic position capable of efficiently turning a portion of the trailer side flow into the base region to reduce base drag FIG. 13. The spring forces of the gas spring cylinders are sized to provide a self extending capacity when unlocked, which aids rapid fairing deployment. The spring, in conjunction with the gas inside the cylinder, when fully extended into camber position, then provides both a restraining force as well as a damping force to isolate the buffeting loads present in the base wake.

When the cambered fairing is ready to be stowed, the cam latch 48 is unlocked, then the spring forces in the cylinders must be overcome in order for the fairing to be returned to its stowed flat position. This is achieved rapidly for each trailer door by the retrieval system shown in FIGS. 5, 8 & 15. This system consists of small flexible cables 28 attached to each gas spring cylinder 22 at its rod end pivot point 23, which then feed back along each cylinder length to a pulley 32 mounted transversely near each cylinder end pivot point, such that when tensioned, provides a compression force along the rod axis to recompress each spring. These small cables then feed down to the cam and bale shaft mount bracket FIG. 14, 35, located at each lower door hinge, where an additional pulley, FIG. 15, 34, and a retrieval reel 36 of sufficient diameter and fitted with a slotted shaft, can be rotated several revolutions and then pin locked using holes on its outer perimeter. The retrieval reel is rotated by means of a lever arm slotted crank which is also used to rotate and release the cam shaft from a locked position. A separate bale lever arm handle 37 is provided on the bale shaft for its rotation. The retrieval system design provides for a rapid retraction and locking operation that can be quickly employed by the truck operator. The truck operator performs the same crank and turn function as is used to unlock the trailer doors before opening, thus the degree of skill and elapsed timing for both extending or retracting of the fairings would be similar. This feature would save deployment and stowage time over that of other design concepts referenced, thus making the present design more likely to be adopted by the industry. For security, as well as safety, the cam shaft is provided with an additional locking lever arm 40, which when in the stowed position, lies flat against the mount bracket 35, permitting a padlock to be secured to adjacent lined holes, 42 & 43, and when extended, to lock the cam shaft to the lower trailer door hinge pin 12 using lock bracket 50, so that the cams are restrained against buffeting loads. The locking attachment 48 features an adjustable length to allow the cam to be fixed at adjustable camber section positions, and boundary layer induction overhangs.

As described in claim 1, the leading edge of the rectangular fairing, when fully extended, can rotate outward into the trailer side flow field boundary layer. This rotation into the boundary layer is by design, adjustable, in that the amount of rotation and translation of the leading edge into the boundary layer is determined by the hinged pivot length from the leading edge and by the degree of slotting machined into the pivot brackets. For different applications and/or optimizations these variables are assumed embodiments herein contained within the design.

It is an embodiment herein contained within this invention design to provide an apparatus that may be retrofitted onto many of the existing trailer fleets currently operating in the U.S. trucking industry, as well as supplied as original equipment by trailer manufacturers.

OTHER REFERENCES

Schapiro, "Shape and Flow—The Fluid Dynamics of Drag", MIT Anchor Books, Doubleday, N.Y. 1961

Hoerner, "Fluid Dynamic Drag", Pages 13-19 Hoerner Books, 1965, P.O. Box 342, Bricktown, N.J., 08723

Hoerner, "Fluid Dynamic Lift", Pages 4-21 Hoerner Books, 1975, P.O. Box 342, Bricktown, N.J., 08723

NSF/DOT Conference on Reduction of the Aerodynamic Drag of Trucks, Cal. Tech., Pasadena, Calif., October 1974.

Buckley, et.al., "A Study of Aerodynamic Methods for Improving Truck Fuel Economy", University of Maryland, College Park, Md. for NF/RANN, December 1978.

Huirhead, "An Investigation of Drag Reduction on Box-shaped Vehicle with Various Modifications—Final Report", NASA N81-29097, Kansas University Center for Research, August 1981.

The embodiments of the design invention in which an exclusive property or privilege is claimed are defined as follows:

1. A system, comprising:
 a variable geometry aerodynamic shaped thin rectangular fairing,
  wherein the fairing is attached vertically to each side of rear doors of a last of at least one tractor pulled trailer,
  wherein when the fairing is extended from a stowed position, the fairing intercepts a portion of a boundary layer flow adjacent to each side of the trailer in a manner in which a controlled portion of the boundary layer flow as well as a portion of a the mainstream side air flow is directly turned and injected into a rearward turbulent base flow region of the trailer.

2. The system as recited in claim 1, wherein the fairing is adapted for extending from a stowed position to form a cambered airfoil at a fixed angle of attack to a trailer side flow field in such a manner as to efficiently turn a portion of a main side flow field around a top surface of the airfoil without inducing flow separation, back into a rearward turbulent base region of asymmetric vortices, to reduce a base region vortices' strength and trailer base drag.

3. The system as recited in claim 1, further comprising mechanical linkages and pinned restraints attached to an inside of the fairing which are adapted for inducing into the fairing, when the linkages are deployed, variable camber shapes which are configurable for the trailer travelling at different highway speeds.

4. The system as recited in claim 1, wherein a mechanically hinged mounting between a leading edge of the fairing and two or more rear door hinge pins provides a rotating taming motion to the fairing allowing for a shape of the fairing to be adjusted using a camber, an adjustable overhang of the fairing leading edge into a trailer side wall boundary layer, and rapid retraction of the fairing into a flat folded position.

5. The fairing as recited in claim 1, wherein the fairing is structurally characterized in that a shaped curvature of the fairing is designed to turn air flows in a manner to induce a pressure rise within a base low pressure region, wherein the base low pressure region is located in a wake region of the trailer.

6. The system as recited In claim 1, where the fairing is attached to the rear door with by means of door hinge pins that support the rear, door and the system further comprising, for each rear door:

- two or more gas springs with expanding ends, which are attached near the middle of the fairing with rod pin pivots and by a pivoting mounting end attached to a connecting frame,
- camber arms which are connected to an internal shaft mounted through the connected frame, such that when rotated in an arc various degrees of camber can be produced,
- a cable reel which is attached to the connecting frame which reels two or more wires which are attached to the mount end of the gas springs, where the system is designed to allow the gas springs to extend the fairing outward into the airflow during travel and the cable reel to compress the gas springs for a flat fairing stowage.

7. A method for reducing base drag in a tractor trailer, the method comprising: intercepting a portion of a boundary layer flow adjacent to each side of the trailer in a manner in which a controlled portion of the boundary layer flow as well as a portion of a mainstream side air flow is directly turned and injected into a rearward turbulent base flow region of the trailer.

* * * * *